(12) United States Patent
Chou

(10) Patent No.: US 12,555,247 B2
(45) Date of Patent: Feb. 17, 2026

(54) VIDEO ANALYSIS SYSTEM AND VIDEO ANALYSIS METHOD

(71) Applicant: Wistron Corporation, New Taipei (TW)

(72) Inventor: Chu Hao Chou, New Taipei (TW)

(73) Assignee: Wistron Corporation, New Taipei (TW)

( * ) Notice: Subject to any disclaimer, the term of this patent is extended or adjusted under 35 U.S.C. 154(b) by 377 days.

(21) Appl. No.: 18/331,182

(22) Filed: Jun. 8, 2023

(65) Prior Publication Data

US 2024/0312025 A1 Sep. 19, 2024

(30) Foreign Application Priority Data

Mar. 17, 2023 (TW) .................................. 112110035

(51) Int. Cl.
*G06K 9/00* (2022.01)
*G06T 7/246* (2017.01)
*G06V 10/74* (2022.01)

(52) U.S. Cl.
CPC ............ *G06T 7/246* (2017.01); *G06V 10/761* (2022.01); *G06T 2207/20044* (2013.01)

(58) Field of Classification Search
None
See application file for complete search history.

(56) References Cited

U.S. PATENT DOCUMENTS

2021/0375426 A1* 12/2021 Gobezie ................. G16H 80/00

FOREIGN PATENT DOCUMENTS

| CN | 112004042 | 11/2020 |
|---|---|---|
| TW | M451612 | 4/2013 |

OTHER PUBLICATIONS

"Office Action of Taiwan Counterpart Application", issued on Jul. 27, 2023, p. 1-p. 7.

* cited by examiner

*Primary Examiner* — SJ Park
(74) *Attorney, Agent, or Firm* — JCIPRNET

(57) ABSTRACT

A video analysis system and a video analysis method are provided. The video analysis method includes: transmitting multiple images by multiple second electronic devices; receiving the images by a server; receiving an image stream from the server after a specific channel is designated by a first electronic device; requesting the server to record the image stream by the first electronic device; in response to an end of an analysis activity being analyzed by the first electronic device or the first electronic device determining that a recording time of the server exceeds a default time, receiving the image stream from the server by the first electronic device.

20 Claims, 6 Drawing Sheets

VIDEO ANALYSIS SYSTEM AND VIDEO ANALYSIS METHOD

CROSS-REFERENCE TO RELATED APPLICATION

This application claims the priority benefit of Taiwan application serial no. 112110035, filed on Mar. 17, 2023. The entirety of the above-mentioned patent application is hereby incorporated by reference herein and made a part of this specification.

BACKGROUND

Technical Field

The invention relates to a video analysis system and a video analysis method.

Description of Related Art

Among treatment courses provided by a rehabilitation center, some rehabilitation courses may require the use of rehabilitation aids. Patients with mild symptoms may wear the rehabilitation aids by themselves to carry on the rehabilitation course. However, doctors still have to be on site to check whether the patients wear the rehabilitation aids correctly. On the other hand, the existing rehabilitation aids include robotic exoskeleton, which is used to assist patients with lower limb disability to walk more effortlessly. However, when a patient uses the robotic exoskeleton for rehabilitation, if there is no doctor on site, the patient will not be able to know whether his rehabilitation action is correct.

Based on the above description, it is one of the goals of those skilled in the art to propose a method that allows doctors to remotely monitor the rehabilitation courses of patients.

SUMMARY

The invention is directed to a video analysis system and a video analysis method, which are adapted to provide a user with an image stream and rehabilitation quantitative data of a rehabilitation course of a patient.

The invention provides a video analysis system including a first electronic device, a plurality of second electronic devices, and a server. The second electronic devices are configured to transmit a plurality of images. The server is configured to receive the images. The first electronic device receives an image stream from the server after designating a specific channel. The first electronic device requests the server to record the image stream. In response to an end of an analysis activity being analyzed by the first electronic device or the first electronic device determining that a recording time of the server exceeds a default time, the first electronic device receives the image stream from the server.

In an embodiment of the invention, some of the images include an exoskeleton image. The server receives the images in real time to form the image stream.

In an embodiment of the invention, the second electronic devices join the specific channel, which means that the second electronic devices are located in a same field. The second electronic devices share the specific channel and respective device information of the second electronic devices to the server.

In an embodiment of the invention, the server includes a communication device and a video recording device. The communication device is configured to maintain a connection state between the first electronic device and the second electronic devices. The video recording device is configured to record the image stream.

In an embodiment of the invention, the server analyzes a plurality of joint point coordinates of each frame in the image stream, and calculates a plurality of key joint azimuths based on a plurality of key joint point coordinates.

In an embodiment of the invention, the server loads sample data having a plurality of sample joint azimuths, and compares each of the sample joint azimuths of the sample data with each of the key joint azimuths to generate a similarity value.

In an embodiment of the invention, the server loads sample data having a plurality of sample joint azimuths and calculates respective error values of each of the key joint azimuths and each corresponding one of the sample joint azimuths for a plurality of actions, and sums up all of the error values to obtain an average, so as to obtain a first similarity value of the actions.

In an embodiment of the invention, the server calculates respective error values of each of a plurality of exoskeleton joint azimuths when a human body wears an exoskeleton and each corresponding one of the sample joint azimuths for a plurality of actions, and sums up all of the error values to obtain an average, so as to obtain a second similarity value of the actions.

In an embodiment of the invention, the server compares the first similarity value and the second similarity value to obtain rehabilitation quantitative data, in response to the human body wearing a robotic exoskeleton.

In an embodiment of the invention, the server calculates a plurality of joint azimuths according to the joint point coordinates, loads sample data having a plurality of sample joint azimuths, and compares each of the sample joint azimuths of the sample data with each of the joint azimuths to generate a similarity value. The server determines that the joint point coordinates belong to the key joint point coordinates in response to the similarity value being greater than a threshold.

The invention provides a video analysis method adapted to a video analysis system including a first electronic device, a plurality of second electronic devices, and a server. The video analysis method includes: transmitting a plurality of images by the plurality of second electronic devices; receiving the images by a server; receiving an image stream from the server after a specific channel is designated by the first electronic device; requesting the server to record the image stream by the first electronic device; and in response to an end of an analysis activity being analyzed by the first electronic device or the first electronic device determining that a recording time of the server exceeds a default time, receiving the image stream from the server by the first electronic device.

In an embodiment of the invention, some of the images include an exoskeleton image. The server receives the images in real time to form the image stream.

In an embodiment of the invention, the second electronic devices join the specific channel, which means that the second electronic devices are located in a same field. The second electronic devices share device information associated with the specific channel and the second electronic devices to the server.

In an embodiment of the invention, the video analysis system further includes a communication device configured to maintain a connection state between the first electronic device and the second electronic devices and a video recording device configured to record the image stream.

In an embodiment of the invention, the video analysis method further includes: analyzing a plurality of joint point coordinates of each frame in the image stream by the server, and calculating a plurality of key joint azimuths based on a plurality of key joint point coordinates.

In an embodiment of the invention, the video analysis method further includes: loading sample data by the server, and comparing each sample joint azimuth of the sample data with each of the key joint azimuths to generate a similarity value.

In an embodiment of the invention, the video analysis method further includes: loading sample data having a plurality of sample joint azimuths and calculating respective error values of each of the key joint azimuths and each corresponding one of the sample joint azimuths for a plurality of actions by the server, and summing up all of the error values to obtain an average, so as to obtain a first similarity value of the actions.

In an embodiment of the invention, the video analysis method further includes: calculating respective error values of each of a plurality of exoskeleton joint azimuths when a human body wears an exoskeleton and each corresponding one of the sample joint azimuths for a plurality of actions by the server, and summing up all of the error values to obtain an average, so as to obtain a second similarity value of the actions.

In an embodiment of the invention, the video analysis method further includes: comparing the first similarity value and the second similarity value by the server to obtain rehabilitation quantitative data, in response to the human body wearing a robotic exoskeleton. In an embodiment of the invention, the video analysis method further includes:

calculating a first joint azimuth according to first joint point coordinates among the joint point coordinates by the server; loading sample data by the server, and comparing a sample joint azimuth of the sample data with the first joint azimuth to generate a first value; and determining that the first joint point coordinates are one of the key joint point coordinates by the server in response to the first value being greater than a threshold.

Based on the above description, the video analysis system of the invention may determine the similarity value between an action of a patient wearing or not wearing a robotic exoskeleton and a demonstration action, so as to generate rehabilitation quantitative data. Users of the video analysis system may refer to the rehabilitation quantitative data to analyze whether the robotic exoskeleton is effective for the rehabilitation course of the patient.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
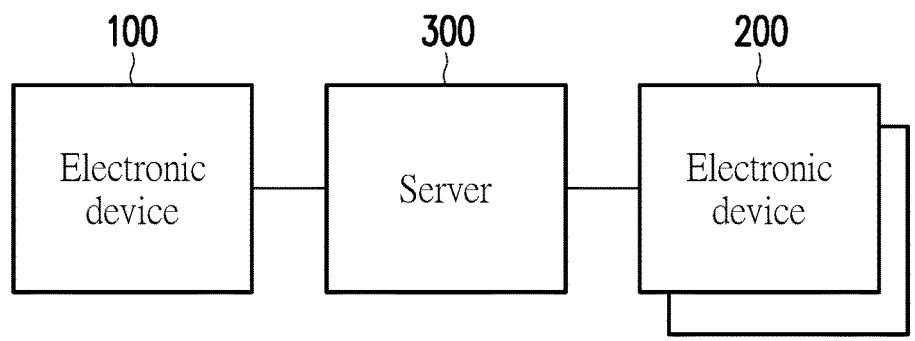
FIG. 1 is a schematic diagram of a video analysis system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic diagram of a video analysis system 10 according to an embodiment of the invention. The video analysis system 10 may include an electronic device 100, one or a plurality of electronic devices 200 and a server 300. The electronic device 100, the electronic devices 200 and the server 300 may communicate with each other.

The electronic device 100 is, for example, a tablet computer, a personal computer, a notebook computer or a smart phone. The electronic device 100 may be carried by a doctor, and may be used to play an image stream of a patient's rehabilitation course (or exercise process) for the doctor to watch. The electronic device 100 has a processing unit (for example: a processor), a communication device (for example, various communication chips, a mobile communication chip, a Bluetooth chip or a WiFi chip) and a storage device (for example, a removable random access memory, a flash memory or a hard disk) and other necessary components required for running the electronic device 100. Applications for executing various functions of the electronic device 100 may be stored in the storage device of the electronic device 100.

The electronic device 200 is, for example, a tablet computer, a personal computer, a notebook computer or a smart phone. The one or plurality of electronic devices 200 (for example, two or more electronic devices 200) may be set in a same field where the patient performs rehabilitation, and may be used to capture the patient's rehabilitation course from various angles to generate an image stream.

Figure 2:
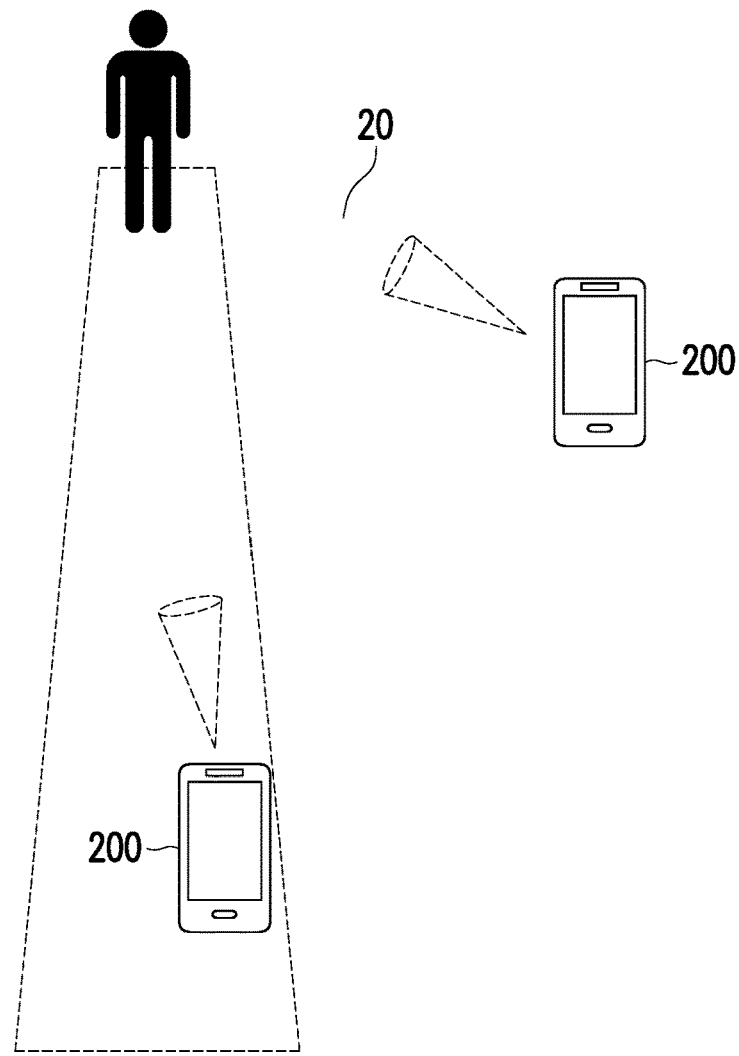
FIG. 2 is a schematic diagram illustrating a situation where a patient performs rehabilitation according to an embodiment of the invention.

As shown in FIG. 2, FIG. 2 is a schematic diagram illustrating a situation where a patient performs rehabilitation according to an embodiment of the invention. In FIG. 2, two electronic devices 200 may be set at a field 20, where the field 20 is a site where patients perform rehabilitation (for example, a hospital or a rehabilitation center). The electronic device 200 has a processing unit (for example, a processor), a communication device (for example, various communication chips, a mobile communication chip, a Bluetooth chip or a WiFi chip), a storage device (for example, a removable random access memory, a flash memory or a hard disk), a video capturing device, and other necessary components required for running the electronic device 100. Applications for executing various functions of the electronic device 200 may be stored in the storage device of the electronic device 200.

The server 300 is, for example, a personal computer, a notebook computer or a workstation computer. The server 300 may, for example, adopt an Open Vidu platform. The server 300 may serve as a relay device for signal transmission between the electronic device 100 and the electronic devices 200. The server 300 may also perform operations such as recording image streams. The server 300 has a processing unit (for example, a processor), a communication device (for example, various communication chips, a mobile communication chip, a Bluetooth chip or a WiFi chip), a storage device (for example, a removable random access memory, a flash memory body or a hard disk), a video recording device and other necessary components required for running the server 300. The communication device of the server 300 may maintain an always-on state to receive instructions or data from the electronic device 100 or the electronic devices 200 at any time. The server 300 may be triggered by an instruction from the electronic device 100 or the electronic device 200 (for example, an instruction to start video recording issued by the electronic device 100) to start maintaining a connection state between the electronic device 100 and the electronic devices 200 (i.e., to establish a communication connection between the electronic device 100 and the electronic devices 200).

Figure 3:
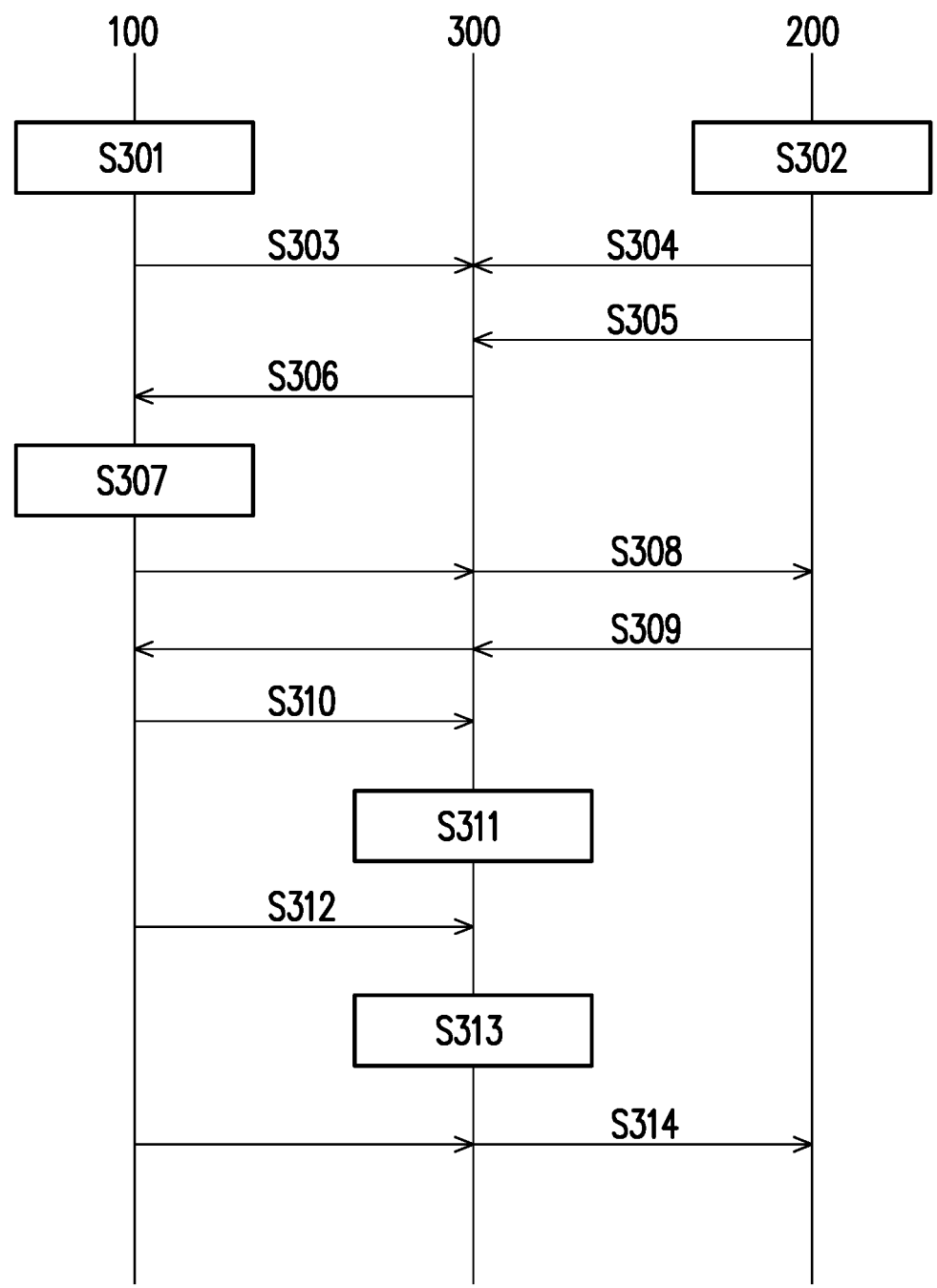
FIG. 3 is a signaling diagram of the video analysis system according to an embodiment of the invention.

The video analysis system 10 may be used to record an image stream of a rehabilitation course of a patient (for example: walking with or without a robotic exoskeleton). FIG. 3 is a signaling diagram of the video analysis system 10 according to an embodiment of the invention.

In step S301, when a doctor wants to watch a rehabilitation situation of a patient, the electronic device 100 may be operated to activate the application of the electronic device 100. In step S302, when the patient intends to perform rehabilitation, the electronic device 200 may be operated to activate the application of the electronic device 200.

In step S303, after the application is activated, the electronic device 100 may be connected to the server 300. In step S304, after the application is activated, the electronic device 200 may be connected to the server 300.

In step S305, when the patient is about to start rehabilitation, the electronic device 200 may be operated to send a request message to the server 300. In step S306, the server 300 may transfer the request message to the electronic device 100. The request message is used to remind the user of the electronic device 100 that the rehabilitation course of the patient is about to start. The request message may include a specific channel (such as a channel "channel X") and device information of one or more electronic devices 200 registered (or joined) in the specific channel. The device information may include field information, a device model or a device specification, etc.

In an embodiment, when the plurality of electronic devices 200 are registered on the same channel, it means that these electronic devices 200 are set in the same field. For example, the two electronic devices 200 shown in FIG. 2 are registered on the same channel (i.e., the channel corresponding to the field 20).

For example, it is assumed that these electronic devices 200 are set in a rehabilitation center X, the channel corresponding to the rehabilitation center X may be set as "channel X". When the electronic devices 200 all turn on a photographing function, and the electronic device 100 receives a channel selection signal through a user interface, and the channel selection signal corresponds to the channel "channel X", a viewing angle video captured by each electronic device 200 may be transmitted to the electronic device 100 through the server 300, and a display of the electronic device 100 may display the viewing angle video captured by each electronic device 200, thereby, even if the electronic device 100 is at a remote end, multiple viewing angle images in this field may be seen through the user interface.

In an embodiment, the two electronic devices 200 shown in FIG. 2 are arranged in such a way that one is placed directly in front of a direct walking path of the patient, and the other is placed on a side of the direct walking path of the patient to obtain images from different viewing angles. However, the placement method of the electronic device 200 is not limited thereto.

In an embodiment, the electronic device 200 may request the electronic device 100 or the server 300 to register as a device of the specific channel through a request message. For example, if the electronic device 200 has not been registered as a device corresponding to the channel of the field 20, the electronic device 200 may send registration information to the electronic device 100 through a request message to request registration as a device of the field 20.

In step S307, the electronic device 100 may obtain device information from the request message. For example, the electronic device 100 may communicate with the server 300 or the electronic device 200 based on a message queuing telemetry transport (MQTT) protocol to obtain the device information. The electronic device 100 may display the device information for the user of the electronic device 100 to view, so as to provide a channel associated with the device information (i.e., the channel corresponding to the field 20 and the electronic device 200) for the user to select. If the user selects an option of the channel, it means that the user wants to watch a rehabilitation state of the patient in the field 20. In this way, in step S308, the electronic device 100 may send a confirmation message to the server 300 according to the user's selection, where the confirmation message is used to designate a specific channel, i.e., the channel corresponding to the field 20. After receiving the confirmation message, the server 300 may establish a data transmission channel between the server 300 and the electronic devices 200 according to the confirmation message, so as to start receiving images from the electronic devices 200.

In an embodiment, multiple electronic devices 200 join the specific channel, which means that these electronic devices 200 are located in the same field 20, and these electronic devices 200 share the specific channel and their respective device information to the server 300.

In step S309, one or more electronic devices 200 may respectively capture one or more images of the field 20, and connect to the server 300 through the data transmission channel to transmit the one or more images to the server 300, where some of the images may include a general video (i.e., a video of the patient not wearing the robotic exoskeleton for rehabilitation) and an exoskeleton image (i.e., a video of the patient wearing the robotic exoskeleton to perform rehabilitation). The server 300 may receive these images in real-time to form an image stream, and transmit the image stream to the electronic device 100. The electronic device 100 may display the image stream for the user to watch. In an embodiment, the electronic devices 200 may be operated by a person in the field 20 to start capturing images of the field 20.

In step S310, the electronic device 100 may send an instruction to the server 300 to request the server 300 to record the image stream. In step S311, the server 300 may start recording the image stream through the video recording device according to the received instruction.

In step S312, the electronic device 100 may send an instruction to the server 300 to request the server 300 to stop recording the image stream. In step S313, the server 300 may stop recording the image stream according to the received instruction. In an embodiment, the server 300 may further instruct the electronic devices 200 to stop capturing and uploading images according to a received instruction.

The instruction transmitted from the electronic device 100 to the server 300 in step S312 may be triggered by an event. In an embodiment, the electronic device 100 is operated to transmit the instruction. In another embodiment, the electronic device 100 may analyze the image stream to determine an end of the activity (for example, the end of the patient's rehabilitation course or exercise process), and then transmit the instruction according to a determination result. In still another embodiment, the electronic device 100 may determine that a recording time of the image stream performed by the server 300 exceeds a default time (for example, 60 minutes) and send the instruction.

In step S314, the electronic device 100 may broadcast an instruction to the electronic devices 200 in the field 20 through the server 300 to cut off the connection between the electronic devices 200 and the server 300. After the electronic devices 200 are disconnected, the server 300 may start to process the recorded image streams in batches, and send the processed image streams to the electronic device 100.

Figure 4:
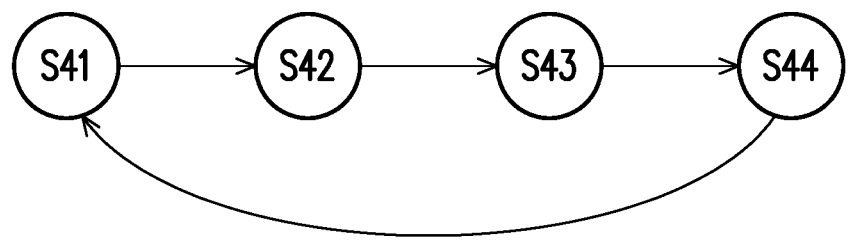
FIG. 4 is a state machine diagram of an application of an electronic device 100 according to an embodiment of the invention.

FIG. 4 is a state machine diagram of an application of the electronic device 100 according to an embodiment of the invention. After the application of the electronic device 100 is activated, the application may enter a state S41. When the application is in the state S41, the application may display a standby image. The standby image may provide channel options for the user to select. After the user selects a channel, the application may enter a state S42.

When the application is in the state S42, the application may provide a preview video of the image stream. The preview video may include one or more images currently captured by one or more electronic devices 200. When the electronic device 100 sends an instruction to the server 300 to request the server 300 to record the image stream, the application enters a state S43.

When the application is in the state S43, the application may display the image stream for the user to watch. When the electronic device 100 sends an instruction to the server 300 to request the server 300 to stop recording the image stream, the application enters a state S44.

When the application is in the state S44, the application may display a prompt message indicating that the rehabilitation course is over for the user's reference. After the electronic device 100 receives a user operation or after a period of time, the application re-enters the state S41.

Figure 5:
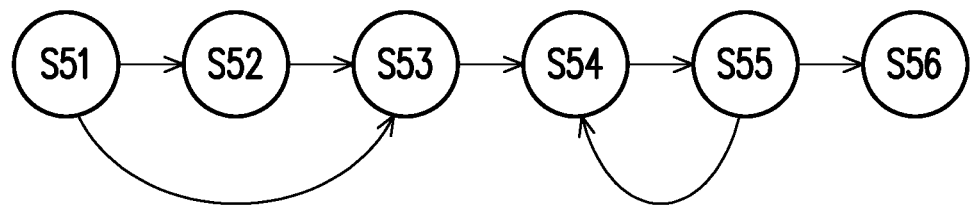
FIG. 5 is a state machine diagram of an application of an electronic device 200 according to an embodiment of the invention.

FIG. 5 is a state machine diagram of an application of the electronic device 200 according to an embodiment of the invention. After the application of the electronic device 200 is activated, the application may enter a state S51. When the application is in the state S51, the application may display a standby image, and may determine whether the electronic device 200 has requested the electronic device 100 or the server 300 to register as a device for the specific channel. If the application determines that the registration of the electronic device 200 has not been completed, the application may enter a state S52. If the application program determines that the registration of the electronic device 200 has been completed, the application may enter a state S53.

When the application is in the state S52, the application may display a prompt message indicating that the electronic device 200 has not been registered for the user's reference. When the electronic device 200 sends a request message including registration information to the server 300, the application may enter the state S53.

When the application is in the state S53, the application may display a prompt message indicating that the electronic device 200 has been registered as a device of the specific channel or field for user's reference. After the data transmission channel between the server 300 and the electronic device 200 is established, the application may enter a state S54.

When the application is in the state S54, the application may display a prompt message indicating that the electronic device 200 has joined the channel or field for the user's reference. When the electronic device 200 accepts an operation to start capturing and transmitting a video, the application may enter a state S55.

When the application is in the state S55, the application may display a prompt message indicating that the captured video is being sent to the server 300 for the user's reference. When the electronic device 200 receives a broadcast instruction from the electronic device 100 to cut off the connection between the electronic device 200 and the server 300, the application may re-enter the state S54. On the other hand, when the electronic device 200 receives an operation from a person in the field 20 to deactivate the application, the application may enter a state S56. When the application is in the state S56, the application may display a prompt message indicating that the application is about to be deactivated before deactivation.

The server 300 may analyze the image stream to generate and output rehabilitation quantitative data of the patient. Doctors may determine whether the robotic exoskeleton has a positive effect on the rehabilitation course of the patient based on the rehabilitation quantitative data, i.e., determine whether the robotic exoskeleton may correct a walking posture of the patient to be closer to a correct posture.

Figure 6:
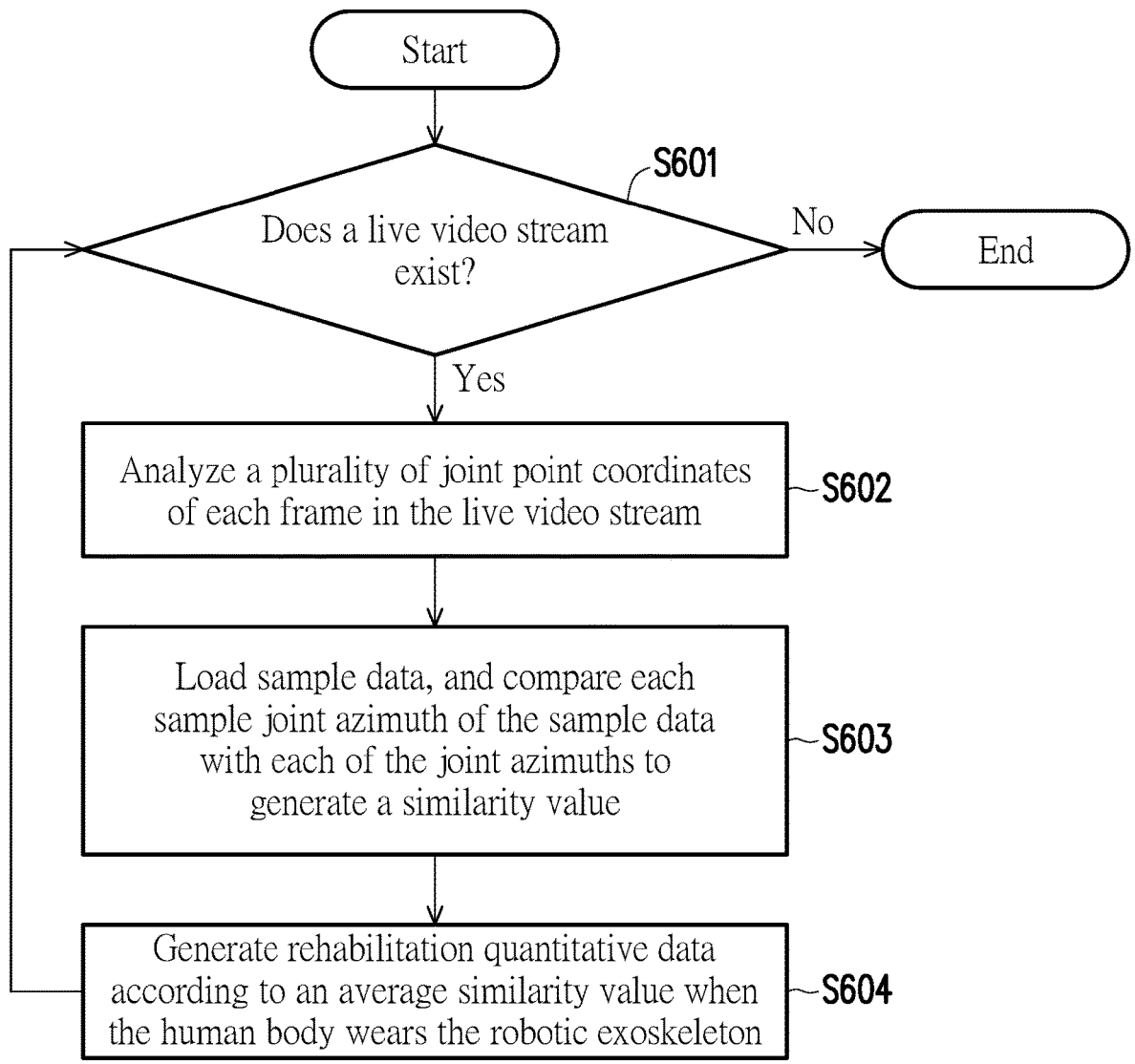
FIG. 6 is a flowchart of generating rehabilitation quantitative data by a server 300 according to an embodiment of the invention.

FIG. 6 is a flowchart of generating rehabilitation quantitative data by the server 300 according to an embodiment of the invention. In step S601, the server 300 may determine whether an image stream exists. If the storage device of the server 300 stores the image stream, the server 300 may determine that the image stream exists, and the process proceeds to step S602. If the storage device of the server 300 does not store the image stream, the server 300 may determine that the image stream does not exist, and end the process.

In step S602, the server 300 may analyze a plurality of joint point coordinates of each frame in the image stream. To be specific, the server 300 may perform image recognition on the frames of the image stream to recognize a plurality of joint points in each frame to obtain the plurality of joint point coordinates, where the plurality of joint points include, for example, a left knee, a left hip, a right knee and a right hip of the patient. The server 300 may use functions provided by a tool Mediapipe or a tool OpenMMLab (for example, a MMPose function or a DeepLabCut function) to extract a human skeleton in each frame to obtain the plurality of joint points and the plurality of joint point coordinates. After obtaining the plurality of joint point coordinates, the server 300 may calculate a plurality of joint azimuths respectively corresponding to the plurality of joint point coordinates according to the plurality of joint point coordinates. The plurality of joint points (or plurality of joint point coordinates) may include a plurality of key joint points (or a plurality of key joint point coordinates) used to generate the rehabilitation quantitative data or a plurality of non-key joint points (or a plurality of non-key joint point coordinates).

In step S603, the server 300 may load sample data, and compare each sample joint azimuth of the sample data with each of the joint azimuths to generate a similarity value, where the sample data includes frames of the video with correct motions captured (for example, normal walking motions including standing, left-foot in front, right-foot in front, etc.). The server 300 may perform image recognition on the frames of the video of the sample data to recognize a plurality of sample joint points in each frame to obtain a plurality of sample joint point coordinates, where the plurality of sample joint points include, for example, the left knee, the left hip, the right knee and the right hip.

Specifically, the plurality of frames of the image stream respectively captures a plurality of actions of the patient wearing/not wearing the robotic exoskeleton. Regarding the plurality of actions of the patient not wearing the robotic exoskeleton, the server 300 may calculate respective error values of each of the joint azimuths and each corresponding sample joint azimuth, so as to calculate the similarity value (or referred to as "first similarity value"). On the other hand, regarding the plurality of actions of the patient wearing the robotic exoskeleton, the server 300 may calculate respective error values of each of the joint azimuths and each corresponding sample joint azimuth, so as to calculate the similarity value (or referred to as "second similarity value"). The first similarity value and the second similarity value will be used by the server 300 to compare with each other to obtain the rehabilitation quantitative data when the human body wears the robotic exoskeleton.

Regarding each frame (or each action), the server 300 may calculate the similarity value according to equation (1) and equation (2). SR represents the similarity value. $MR_i$ represents an error rate corresponding to a joint point i, where i=L1 represents the left knee, i=L2 represents the left hip, i=R1 represents the right knee, and i=R2 represents the right hip, where $MR_i$ may be greater than 0 and less than 1. $p_i$ represents a joint azimuth corresponding to the joint point i. $t_i$ represents a sample joint azimuth corresponding to the joint point i. $MV_i$ represents an error tolerance value corresponding to the joint point i.

$$\begin{cases} MR_i = 1 - \frac{|p_i - L_i|}{MV_i}, & \text{if } |p_i - t_i| > MV_i \\ MR_i = \left(1 - \frac{|p_i - L_i|}{MV_i}\right) \cdot 0.2, & \text{if } |p_i - t_i| \le MV_i \end{cases} \quad (1)$$

$$SR = (MR_{L1} + MR_{L2} + MR_{R1} + MR_{R2})/4 \quad (2)$$

Figure 7A:
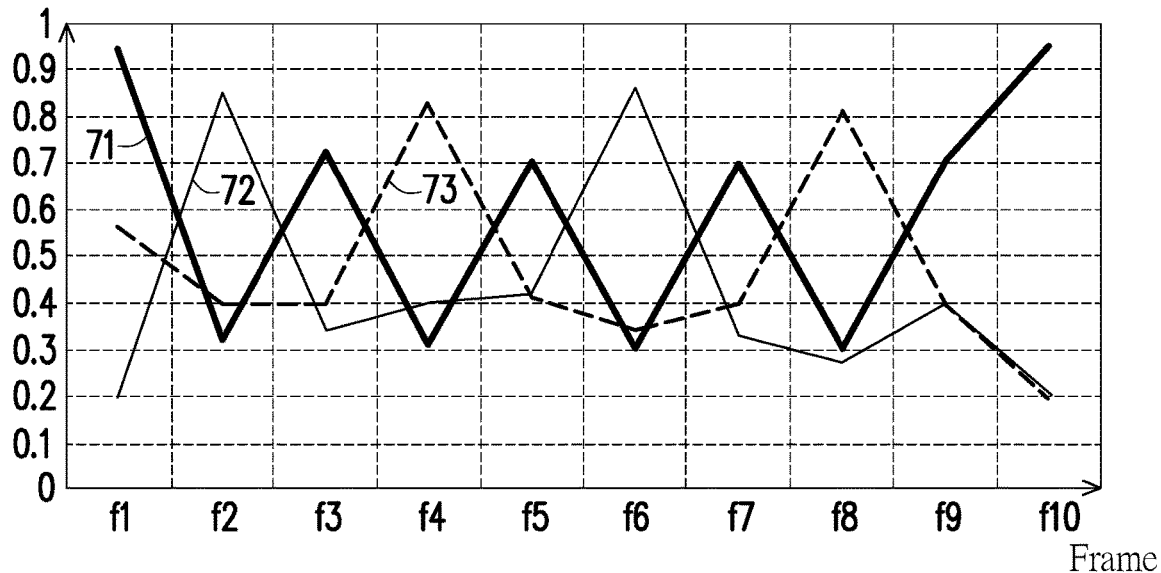
FIG. 7A is a schematic diagram representing line segments corresponding to similarity values of a patient wearing robotic exoskeleton according to an embodiment of the invention.

FIG. 7A is a schematic diagram representing line segments corresponding to similarity values of a patient wearing robotic exoskeleton according to an embodiment of the invention, where a line segment 71 represents the similarity values between each frame of the image stream and a standing action in the sample data, a line segment 72 represents the similarity values between each frame of the image stream and a left-foot in front action of the sample data, and a line segment 73 represents the similarity values between each frame of the image stream and a right-foot in front action of the sample data. Table 1 records the similarity values of the line segments in each frame in FIG. 7A. Taking a frame f1 and a frame f2 as an example, in the frame f1, the action of the patient wearing the robotic exoskeleton has the largest similarity value with the standing action in the sample data, so that the server 300 may determine that the action of the patient in the frame f1 is standing. In the frame f2, the action of the patient wearing the robotic exoskeleton has the largest similarity value with the left-foot in front action in the sample data, so that the server 300 may determine that the action of the patient in the frame f2 is left-foot in front.

TABLE 1

| Frame | Line segment 71 | Line segment 72 | Line segment 73 |
|---|---|---|---|
| f1 | 0.94 | 0.2 | 0.56 |
| f2 | 0.321 | 0.85 | 0.4 |
| f3 | 0.72 | 0.34 | 0.4 |
| f4 | 0.31 | 0.4 | 0.83 |
| f5 | 0.703 | 0.42 | 0.41 |
| f6 | 0.3 | 0.86 | 0.34 |
| f7 | 0.7 | 0.33 | 0.4 |
| f8 | 0.3 | 0.27 | 0.81 |
| f9 | 0.7 | 0.4 | 0.4 |
| f10 | 0.95 | 0.202 | 0.2 |

Regarding a specific action (for example: standing, left-foot in front or right-foot in front), the server 300 may pre-define a threshold, where the threshold is set for the patient wearing the robotic exoskeleton. The server 300 may determine whether the similarity value of the frame corresponding to the video of the patient wearing the robotic exoskeleton is greater than the threshold. If the similarity value is greater than the threshold, it means that the action in the frame matches the specific action. Accordingly, the server 300 may determine that the plurality of joint points in the frame belong to the key joint points corresponding to the specific action, and the plurality of joint point coordinates in the frame belong to the key joint point coordinates corresponding to the specific action. If the similarity value is less than or equal to the threshold, it means that the action in the frame does not match the specific action. Accordingly, the server 300 may determine that the plurality of joint points in the frame do not belong to the key joint points corresponding to the specific action, and the plurality of joint point coordinates in the frame do not belong to the key joint point coordinates corresponding to the specific action. The server 300 may obtain a plurality of similarity values corresponding to the key joint point coordinates of the specific action, and calculate an average of the similarity values to obtain an average similarity value corresponding to the specific action.

Taking the frame f2 in table 1 as an example, it is assumed that the predefined threshold of the left-foot in front action is 0.7. The server 300 may determine that the similarity value 0.321 of the line segment 71 corresponding to the standing action is smaller than the threshold 0.7, the similarity value 0.85 of the line segment 72 corresponding to the left-foot in front action is greater than the threshold value 0.7, and the similarity value 0.4 of the line segment 73 corresponding to the right-foot in front action is smaller than the threshold value 0.7. Accordingly, the server 300 may determine that the plurality of joint points in the frame f2 belong to the key joint points of the left-foot in front action, but do not belong to the key joint points of the standing action or the right-foot in front action. The server 300 may retain the similarity values related to the key joint points and filter out the similarity values not related to the key joint points. Deduced by analogy, the server 300 may filter the data in table 1 to obtain the similarity values related to the left-foot in front action, such as the similarity values 0.85 and 0.86 shown in table 2. Accordingly, the server 300 may calculate an average similarity value of 0.855 corresponding to the left-foot in front action according to the similarity values 0.85 and 0.86. The higher the average similarity value corresponding to the specific action is, the higher the correctness of the patient performing the specific action is.

TABLE 2

| Frame | Line segment 71 | Line segment 72 | Line segment 73 |
|---|---|---|---|
| f1 | — | — | — |
| f2 | — | 0.85 | — |
| f3 | — | — | — |
| f4 | — | — | — |
| f5 | — | — | — |
| f6 | — | 0.86 | — |
| f7 | — | — | — |
| f8 | — | — | — |
| f9 | — | — | — |
| f10 | — | — | — |

Average similarity value (corresponding to the left-foot in front action) = (0.85 + 0.86)/2 = 0.855

Figure 7B:
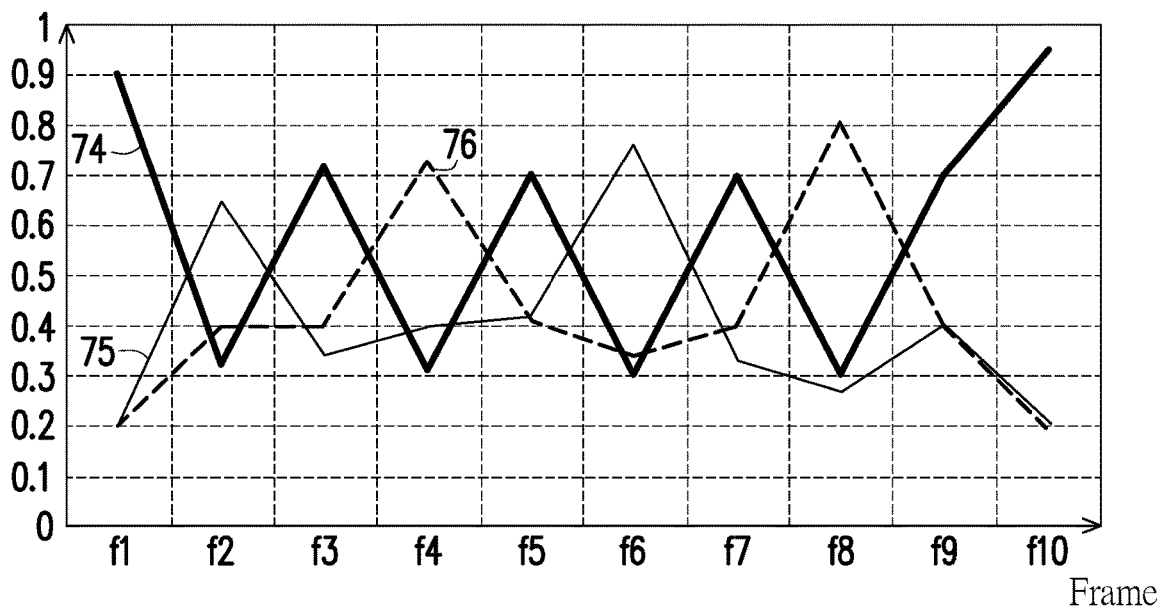
FIG. 7B is a schematic diagram representing line segments corresponding to similarity values of a patient not wearing robotic exoskeleton according to an embodiment of the invention.

FIG. 7B is a schematic diagram representing line segments corresponding to similarity values of a patient not wearing robotic exoskeleton according to an embodiment of the invention, where a line segment 74 represents the similarity values between each frame of the image stream and the standing action in the sample data, a line segment 75 represents the similarity values between each frame of the image stream and the left-foot in front action of the sample data, and a line segment 736 represents the similarity values between each frame of the image stream and the right-foot in front action of the sample data. Table 1 records the similarity values of the line segments in each frame in FIG. 7B. Taking the frame f1 and the frame f2 as an example, in the frame f1, the action of the patient not wearing the robotic exoskeleton has the largest similarity value with the standing action in the sample data, so that the server 300 may determine that the action of the patient in the frame f1 is standing. In the frame f2, the action of the patient not wearing the robotic exoskeleton has the largest similarity value with the left-foot in front action in the sample data, so that the server 300 may determine that the action of the patient in the frame f2 is left-foot in front.

TABLE 3

| Frame | Line segment 74 | Line segment 75 | Line segment 76 |
|---|---|---|---|
| f1 | 0.9 | 0.2 | 0.2 |
| f2 | 0.321 | 0.65 | 0.4 |
| f3 | 0.72 | 0.34 | 0.4 |
| f4 | 0.31 | 0.4 | 0.73 |
| f5 | 0.703 | 0.42 | 0.41 |
| f6 | 0.3 | 0.76 | 0.34 |
| f7 | 0.7 | 0.33 | 0.4 |
| f8 | 0.3 | 0.27 | 0.81 |
| f9 | 0.7 | 0.4 | 0.4 |
| f10 | 0.95 | 0.202 | 0.2 |

Regarding a specific action (for example: standing, left-foot in front or right-foot in front), the server 300 may pre-define a threshold, where the threshold is set for the patient not wearing the robotic exoskeleton. The server 300 may determine whether the similarity value of the frame corresponding to the video of the patient not wearing the robotic exoskeleton is greater than the threshold. If the similarity value is greater than the threshold, it means that the action in the frame matches the specific action. Accordingly, the server 300 may determine that the plurality of joint points in the frame belong to the key joint points corresponding to the specific action, and the plurality of joint point coordinates in the frame belong to the key joint point coordinates corresponding to the specific action. If the similarity value is less than or equal to the threshold, it means that the action in the frame does not match the specific action. Accordingly, the server 300 may determine that the plurality of joint points in the frame do not belong to the key joint points corresponding to the specific action, and the plurality of joint point coordinates in the frame do not belong to the key joint point coordinates corresponding to the specific action. The server 300 may obtain a plurality of similarity values corresponding to the key joint point coordinates of the specific action, and calculate an average of the similarity values to obtain an average similarity value corresponding to the specific action.

Taking the frame f2 in table 3 as an example, it is assumed that the predefined threshold of the left-foot in front action is 0.6. The server 300 may determine that the similarity value 0.321 of the line segment 74 corresponding to the standing action is smaller than the threshold 0.6, the similarity value 0.65 of the line segment 75 corresponding to the left-foot in front action is greater than the threshold value 0.6, and the similarity value 0.4 of the line segment 76 corresponding to the right-foot in front action is smaller than the threshold value 0.6. Accordingly, the server 300 may determine that the plurality of joint points in the frame f2 belong to the key joint points of the left-foot in front action, but do not belong to the key joint points of the standing action or the right-foot in front action. The server 300 may retain the similarity values related to the key joint points and filter out the similarity values not related to the key joint points. Deduced by analogy, the server 300 may filter the data in table 3 to obtain the similarity values related to the left-foot in front action, such as the similarity values 0.65 and 0.76 shown in table 4. Accordingly, the server 300 may calculate an average similarity value of 0.705 corresponding to the left-foot in front action according to the similarity values 0.65 and 0.76. The higher the average similarity value corresponding to the specific action is, the higher the correctness of the patient performing the specific action is.

TABLE 4

| Frame | Line segment 74 | Line segment 75 | Line segment 76 |
|---|---|---|---|
| f1 | — | — | — |
| f2 | — | 0.65 | — |
| f3 | — | — | — |
| f4 | — | — | — |
| f5 | — | — | — |
| f6 | — | 0.76 | — |
| f7 | — | — | — |
| f8 | — | — | — |
| f9 | — | — | — |
| f10 | — | — | — |

Average similarity value (corresponding to the left-foot in front action) = (0.65 + 0.76)/2 = 0.705

Referring back to FIG. 6, in step S604, the server 300 may generate the rehabilitation quantitative data when the human body wears the robotic exoskeleton according to the average similarity value, and may output the rehabilitation quantitative data for user's reference. In an embodiment, the average similarity value may be regarded as the rehabilitation quantitative data. A doctor may use the rehabilitation quantitative data to observe a degree of improvement of the robotic exoskeleton on rehabilitation actions of the patient. Taking table 2 and table 4 as an example, it may be seen from table 2 that when the patient wears the robotic exoskeleton to perform the left-foot in front action, the average similarity value between the left-foot in front action performed by the patient and the left-foot in front action demonstrated by the sample data is 0.855. It may be seen from table 4 that when the patient does not wear the robotic exoskeleton to perform the left-foot in front action, the average similarity value between the left-foot in front action performed by the patient and the left-foot in front action demonstrated by the sample data is 0.705. Based on the fact that the average similarity value of 0.855 is significantly greater than the average similarity value of 0.705, the doctor may determine that the robotic exoskeleton may sufficiently improve the left-foot in front action of the patient, and the left-foot in front action performed by the patient is more similar with the left-foot in front action demonstrated by the sample data.

Figure 8:
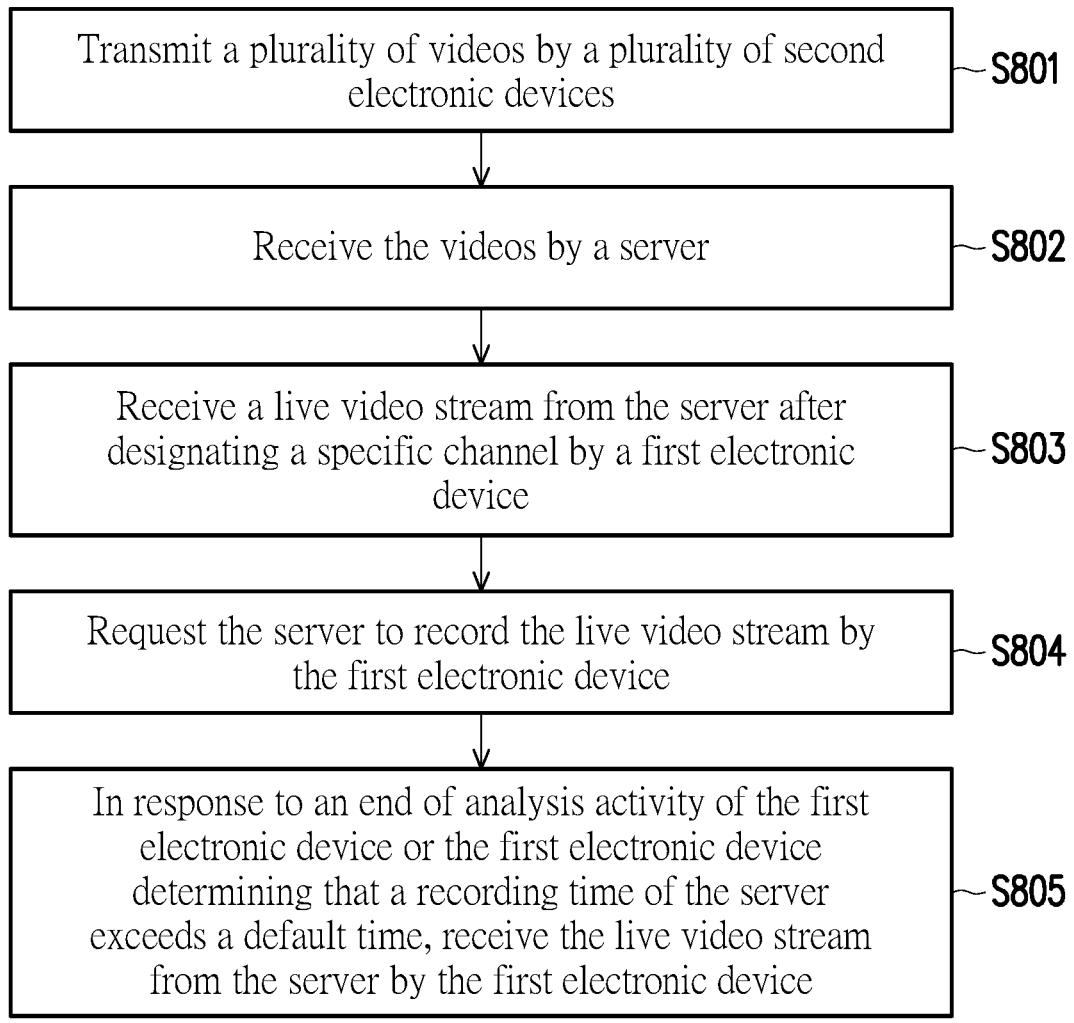
FIG. 8 is a flowchart of a video analysis method according to an embodiment of the invention.

FIG. 8 is a flowchart of a video analysis method according to an embodiment of the invention, where the video analysis method may be implemented by the video analysis system 10 shown in FIG. 1. In step S801, a plurality of second electronic devices (for example, a plurality of video capturing devices) transmit a plurality of images. In step S802, a server receives the images. In step S803, after designating a specific channel, a first electronic device (for example, a tablet computer) receives an image stream from the server. In step S804, the first electronic device requests the server to record the image stream. In step S805, in response to an end of an analysis activity being analyzed by the first electronic device or the first electronic device determining that a recording time of the server exceeds a default time, the first electronic device receives the image stream from the server.

In summary, the image analysis system of the invention may transmit the live image stream of the rehabilitation course of the patient using the robotic exoskeleton to the electronic device carried by the user through a specific channel designated by the user for the user to view. The server may analyze the joint point coordinates in each frame of the image stream to calculate a joint azimuth of each joint point, where the image stream may include images of the patient wearing or not wearing the robotic exoskeleton. The server may obtain the sample data of images recording demonstration actions, and compare the joint azimuth of the patient with the sample joint azimuth of the sample data to determine similarity value between the action of the patient wearing/not wearing the robotic exoskeleton and the demonstration action, so as to generate the rehabilitation quantitative data. Users of the video analysis system may refer to the rehabilitation quantitative data to analyze whether the robotic exoskeleton has a positive effect on the rehabilitation course of the patient.

What is claimed is:

1. A video analysis system, comprising:
a first electronic device; and
a plurality of second electronic devices transmitting a plurality of images to a server, wherein
the first electronic device designating a specific channel for the server,
the server recording an image stream of the designated specific channel,
in response to an end of an activity being analyzed by the first electronic device or the first electronic device determining that a recording time of the server exceeds a default time, the first electronic device receives the recorded image stream of the designated specific channel from the server.

2. The video analysis system as claimed in claim 1, wherein some of the images comprise an exoskeleton image, and the server receives the images in real time to form the image stream.

3. The video analysis system as claimed in claim 1, wherein the second electronic devices join the designated specific channel, which means that the second electronic devices are located in a same field, and the second electronic devices share the designated specific channel and respective device information of the second electronic devices to the server.

4. The video analysis system as claimed in claim 1, wherein the server comprises:
a communication device maintaining a connection state between the first electronic device and the second electronic devices; and
an image recording device recording the image stream.

5. The video analysis system as claimed in claim 1, wherein the server analyzes a plurality of joint point coordinates of each frame in the image stream, and calculates a plurality of key joint azimuths based on a plurality of key joint point coordinates.

6. The video analysis system as claimed in claim 5, wherein the server loads sample data having a plurality of sample joint azimuths, and compares each of the sample joint azimuths of the sample data with each of the key joint azimuths to generate a similarity value.

7. The video analysis system as claimed in claim 5, wherein the server loads sample data having a plurality of sample joint azimuths and calculates respective error values of each of the key joint azimuths and each corresponding one of the sample joint azimuths for a plurality of actions, and sums up all of the error values to obtain an average, so as to obtain a first similarity value of the actions.

8. The video analysis system as claimed in claim 7, wherein the server calculates respective error values of each of a plurality of exoskeleton joint azimuths when a human body wears an exoskeleton and each corresponding one of the sample joint azimuths for a plurality of actions, and sums up all of the error values to obtain an average, so as to obtain a second similarity value of the actions.

9. The video analysis system as claimed in claim 8, wherein the server compares the first similarity value and the second similarity value to obtain rehabilitation quantitative data, in response to the human body wearing a robotic exoskeleton.

10. The video analysis system as claimed in claim 5, wherein
the server calculates a plurality of joint azimuths based on the joint point coordinates, loads sample data having a plurality of sample joint azimuths, and compares each of the sample joint azimuths of the sample data with each of the joint azimuths to generate a similarity value, wherein
the server determines that the joint point coordinates belong to the key joint point coordinates in response to the similarity value being greater than a threshold.

11. A video analysis method, adapted to a video analysis system comprising a first electronic device, a plurality of second electronic devices, and a server, the video analysis method comprising:
transmitting a plurality of images to the server by the plurality of second electronic devices;
designating a specific channel for the server by the first electronic device;
recording an image stream of the designated specific channel by the server; and in response to an end of an activity being analyzed by the first electronic device or the first electronic device determining that a recording time of the server exceeds a default time, receiving the recorded image stream of the designated specific channel from the server by the first electronic device.

12. The video analysis method as claimed in claim 11, wherein some of the images comprise an exoskeleton image, and the server receives the images in real time to form the image stream.

13. The video analysis method as claimed in claim 11, wherein the second electronic devices join the designated specific channel, which means that the second electronic devices are located in a same field, and the second electronic devices share device information associated with the designated specific channel and the second electronic devices to the server.

14. The video analysis method as claimed in claim 11, wherein the video analysis system further comprises a communication device maintaining a connection state between the first electronic device and the second electronic devices and a video recording device recording the image stream.

15. The video analysis method as claimed in claim 11, further comprising:
analyzing a plurality of joint point coordinates of each frame in the image stream, and calculating a plurality of key joint azimuths based on a plurality of key joint point coordinates by the server.

16. The video analysis method as claimed in claim 15, further comprising:
loading sample data having a plurality of sample joint azimuths, and comparing each of the sample joint azimuths of the sample data with each of the key joint azimuths to generate a similarity value by the server.

17. The video analysis method as claimed in claim 15, further comprising:
loading sample data having a plurality of sample joint azimuths and calculating respective error values of each of the key joint azimuths and each corresponding one of the sample joint azimuths for a plurality of actions, and summing up all of the error values to obtain an average by the server, so as to obtain a first similarity value of the actions.

18. The video analysis method as claimed in claim 17, further comprising:
calculating respective error values of each of a plurality of exoskeleton joint azimuths when a human body wears an exoskeleton and each corresponding one of the sample joint azimuths for a plurality of actions, and summing up all of the error values to obtain an average by the server, so as to obtain a second similarity value of the actions.

19. The video analysis method as claimed in claim 18, further comprising:
comparing the first similarity value and the second similarity value by the server to obtain rehabilitation quantitative data, in response to the human body wearing a robotic exoskeleton.

20. The video analysis method as claimed in claim 15, further comprising:
calculating a first joint azimuth based on first joint point coordinates among the joint point coordinates by the server;
loading sample data having a plurality of sample joint azimuths, and comparing each of the sample joint azimuths of the sample data with the first joint azimuth to generate a first value by the server; and
determining that the first joint point coordinates are one of the key joint point coordinates by the server in response to the first value being greater than a threshold.

* * * * *